(12) United States Patent
Li et al.

(10) Patent No.: US 9,372,568 B2
(45) Date of Patent: Jun. 21, 2016

(54) METHOD, DEVICE AND SYSTEM FOR INTERACTING

(71) Applicants: Beijing Lenovo Software Ltd, Beijing (CN); Lenovo (Beijing) Co., Ltd., Beijing (CN)

(72) Inventors: Xin Li, Beijing (CN); Weizhi Lin, Beijing (CN); Cheng Guo, Beijing (CN); Hao Wang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 621 days.

(21) Appl. No.: 13/785,289

(22) Filed: Mar. 5, 2013

(65) Prior Publication Data

US 2013/0229372 A1  Sep. 5, 2013

(30) Foreign Application Priority Data

Mar. 5, 2012 (CN) .......................... 2012 1 0055906
Mar. 28, 2012 (CN) .......................... 2012 1 0086707

(51) Int. Cl.
*G06F 3/041* (2006.01)
*G06F 3/0488* (2013.01)
*G06F 3/03* (2006.01)
*G06F 3/0484* (2013.01)

(52) U.S. Cl.
CPC ................ *G06F 3/0412* (2013.01); *G06F 3/03* (2013.01); *G06F 3/0484* (2013.01); *G06F 3/0488* (2013.01)

(58) Field of Classification Search
CPC .................................................... G06F 3/0412
USPC ........................................................ 345/172
See application file for complete search history.

(56) References Cited

U.S. PATENT DOCUMENTS

| | | | |
|---|---|---|---|
| 2005/0245302 A1* | 11/2005 | Bathiche ................. | A63F 13/00 463/1 |
| 2008/0058045 A1* | 3/2008 | Cortenraad ......... | A63F 3/00643 463/9 |
| 2008/0161086 A1* | 7/2008 | Decre ....................... | A63F 3/02 463/14 |

(Continued)

FOREIGN PATENT DOCUMENTS

| | | |
|---|---|---|
| CN | 101350004 A | 1/2009 |
| CN | 101504582 A | 8/2009 |

(Continued)

OTHER PUBLICATIONS

First Chinese Office Action regarding Application No. 201210055906.4 dated Feb. 8, 2014. English translation provided by Unitalen Attorneys at Law.

(Continued)

*Primary Examiner* — Jason Olson
(74) *Attorney, Agent, or Firm* — Harness, Dickey & Pierce, P.L.C.

(57) ABSTRACT

The present invention discloses a method, device and system for interacting, in which first information of each of the external accessories is obtained, it is judged whether the first information of each of the external accessories satisfies a preset first condition, and each of the external accessories is processed according to the preset first condition if the first information of each of the external accessories satisfies the preset first condition, therefore interaction between an electronic device and the accessories is achieved and user experience is improved.

19 Claims, 5 Drawing Sheets

(56) References Cited

U.S. PATENT DOCUMENTS

| | | | |
|---|---|---|---|
| 2009/0322352 A1* | 12/2009 | Zachut | A63F 3/00643 324/658 |
| 2010/0073315 A1 | 3/2010 | Lee et al. | |
| 2011/0316888 A1 | 12/2011 | Sachs et al. | |
| 2012/0007817 A1* | 1/2012 | Heatherly | A63F 13/02 345/173 |
| 2012/0062490 A1* | 3/2012 | Heatherly | A63F 13/02 345/173 |
| 2014/0035822 A1 | 2/2014 | Zhang | |
| 2015/0042619 A1* | 2/2015 | Forti | G06F 3/0488 345/175 |

FOREIGN PATENT DOCUMENTS

| | | |
|---|---|---|
| CN | 101644961 A | 2/2010 |
| CN | 102171642 A | 8/2011 |

OTHER PUBLICATIONS

Second Chinese Office Action regarding Application No. 201210055906.4 dated Sep. 17, 2014. English translation provided by Unitalen Attorneys at Law.

First Chinese Office Action regarding Application No. 201210086707.X dated Mar. 25, 2014. English translation provided by Unitalen Attorneys at Law.

\* cited by examiner

METHOD, DEVICE AND SYSTEM FOR INTERACTING

CROSS-REFERENCE TO RELATED APPLICATIONS

The present application claims priority to Chinese Patent Application No. 201210055906.4, filed Mar. 5, 2012 and Chinese Patent Application No. 201210086707.X, filed Mar. 28, 2012, the entire disclosure of which is incorporated herein by reference.

FIELD OF THE INVENTION

The present invention relates to the field of communication, and more particularly to method, device and system for interacting.

BACKGROUND OF THE INVENTION

With the progress of the digital technology, an application range of a digital device is being expanded continuously, and a software system adapted to the digital device is being diversified continuously. However, digital devices currently used for demonstrating or simulating a system all utilize a computer and related software to carry out the whole process without any contact to an external real object. For example, when a demonstration is performed to a user by using a multimedia software in a computer, all processes are performed in a virtual environment created by the multimedia software, thus it is impossible to interact with the real object.

SUMMARY OF THE INVENTION

In order to solve the above problem, the embodiment according to the present invention employs a technical solution as follows:

A method for interacting, which is applied in an electronic device and at least two external accessories independent of the electronic device, wherein the electronic device comprises a display device, wherein, the method comprises:

obtaining first information of each of the external accessories;

judging whether the first information of each of the external accessories satisfies a preset first condition; and processing each of the external accessories according to the preset first condition if the first information of each of the external accessories satisfies the preset first condition.

An device for interacting, which is applied in an electronic device and at least two external accessories independent of the electronic device, wherein the electronic device comprises a display device, characterized in that the device further comprises:

an acquiring unit, configured to obtain first information of each of the external accessories; and a processing unit, configured to judge whether the first information of each of the external accessories satisfies a preset first condition and to process each of the external accessories according to the preset first condition if the first information of each of the external accessories satisfies the preset first condition.

A system for interacting, which comprises an electronic device and at least two external accessories independent of the electronic device, wherein the electronic device comprises a display device for displaying an image;

the electronic device is further configured to obtain first information of each of the external accessories, to determine whether the first information of each of the external accessories satisfies a preset first condition, and to process each of the external accessories according to the preset first condition if the first information of each of the external accessories satisfies the preset first condition; and the external accessories are placed on the display device and are configured to transmit the first information to the electronic device.

An embodiment according to the present invention provides a method, device and system for interacting, in which first information of each of the external accessories is obtained, whether the first information of each of the external accessories satisfies a preset first condition is judged, and each of the external accessories is processed according to the preset first condition if the first information of each of the external accessories satisfies the preset first condition. Therefore interaction between an electronic device and the external accessories is achieved and user experience is improved.

BRIEF DESCRIPTION OF THE DRAWINGS

In order to illustrate embodiments of the present invention or technical schemes in the prior art more clearly, the following attached drawings to be used in the embodiments or the prior art are briefly introduced. It is obvious that the following attached drawings described are just some embodiments of the present invention. For those skilled in the art, other drawings may be obtained according to these attached drawings without any creative work.

DETAILED DESCRIPTION OF THE INVENTION

The technical solution in the embodiments of the present invention will be described clearly and completely as follows in conjunction with the attached drawings of the embodiments of the present invention. It is obvious that the described embodiments are only a part of the embodiments of the present invention. All the other embodiments obtained by those skilled in the art based on the embodiments of the present invention without any creative work belong to the scope of protection of the present invention.

An embodiment of the present invention provides a method for interacting, which is applied in an electronic device and at least two external accessories independent of the electronic device, here, the electronic device includes a display device, the method includes:

obtaining first information of each of the external accessories;

judging whether the first information of each of the external accessories satisfies a preset first condition; and processing each of the external accessories according to the preset first condition if the first information of each of the external accessories satisfies the preset first condition.

The method for interacting according to the embodiment of the present invention is capable of processing two or more external accessories by judging the first information of the two or more accessories, thereby the interaction between the electronic device and the external accessories is realized, and moreover the dynamic interaction between the electronic device and a user is realized and the user experience is improved.

Figure 1:
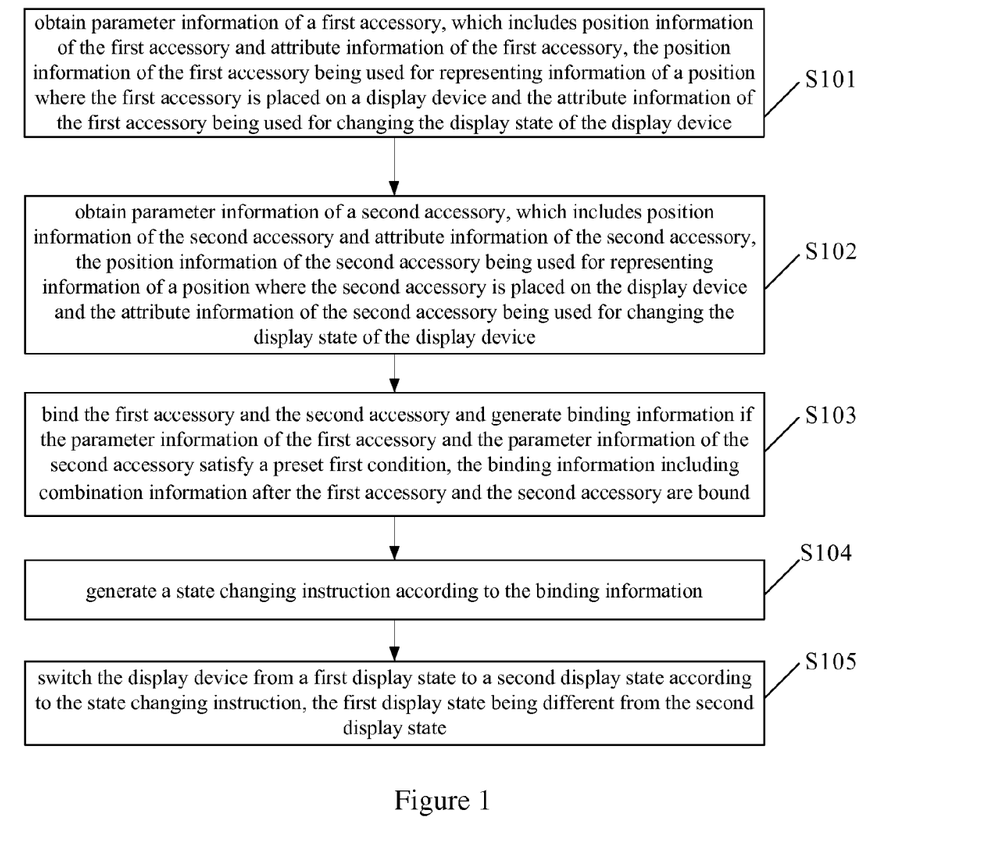
FIG. 1 is a flowchart of a method provided by the present invention.

In an embodiment of the present invention, the first information is parameter information of an external accessory, as shown in FIG. 1, the method includes:

S101, obtaining parameter information of a first accessory. The parameter information of the first accessory includes position information of the first accessory and attribute information of the first accessory, here, the position information of the first accessory is used for representing information of a position where the first accessory is placed on a display device and the attribute information of the first accessory is used for changing the display state of the display device;

S102, obtaining parameter information of a second accessory. The parameter information of a second accessory includes position information of the second accessory and attribute information of the second accessory, here, the position information of the second accessory is used for representing information of a position where the second accessory is placed on the display device and the attribute information of the second accessory is used for changing the display state of the display device;

S103, binding the first accessory and the second accessory and generating binding information if the parameter information of the first accessory and the parameter information of the second accessory satisfy a preset first condition, here, the binding information includes combination information after the first accessory and the second accessory are bound;

S104, generating a state changing instruction according to the binding information; and S105, switching the display state of the display device from a first display state to a second display state according to the state changing instruction, herein, the first display state is different from the second display state.

In an embodiment of the present invention, the first accessory is a real object component independent of an electronic device. During the electronic device performs operations such as a simulating experiment, a user can change a position or type of the first accessory and thus change a display image on a display device. Herein, the display device is a display with an image display function, such as a liquid crystal display (LCD), an electronic display screen and a capacitive or resistive touch screen display. The display device is connected to the electronic device and is used for displaying the display state in a working state of the electronic device. The electronic device is an electronic device with a CPU processing function such as a computer host.

In the prior art, the electronic device realizes operation processes such as a simulating experiment by software and a CPU processor and is incapable of interacting with an accessory independent of the electronic device. In order to realize that the electronic device interacts with at least two accessories independent of the electronic device, the electronic device firstly needs to obtain parameter information of a first accessory. The parameter information of the first accessory includes the position information of the first accessory and the attribute information of the first accessory. The position information of the first accessory is used for representing information of a position where the first accessory is placed on the display device. The attribute information of the first accessory is used for changing the display state of the display device and may be for example a coordinate value of the first accessory on the display device.

In an embodiment, there may be the following two ways to obtain the position information of the first accessory.

According to a first way, the electronic device receives the position information transmitted from the first accessory, and the accessory includes:

an information transmitting module adapted to transmit the position information of the first accessory to the electronic device.

In other embodiments, a data capturing module may be further provided in the first accessory, the data capturing module being adapted to capture the position information of the first accessory initiatively according to the position where the first accessory is placed and to transmit the captured position information to the electronic device via the information transmitting module. The information transmitting module may transmit by means of a wireless transmission function. For example, the information transmitting module may transmit the position information in a wireless transmission manner such as Bluetooth or infrared.

According to a second way, the electronic device captures the position information of the first accessory, and the electronic device includes:

an information capturing module adapted to capture the position information of the first accessory.

In other embodiments, the information capturing module may be a gravity sensor which generates a position coordinate value of the first accessory according to the position of the first accessory captured when the first accessory is placed on the display device and transmits the generated position coordinate value to the electronic device.

In an embodiment, in order to allow the electronic device to obtain a coverage area of the first accessory, the information capturing module may also be a image capture device configured on the display device, which performs image capturing on the first accessory placed on the display device and then transmits the captured image to the electronic device. The electronic device may obtain the coverage area of the accessory by performing a binaryzation processing on the obtained image.

In other embodiments, the information capturing module may also be an infrared detector configured on the display device. The infrared detecting device has a high sensitivity and is capable of scanning the first accessory placed on the display device by emitted infrared ray and thus obtaining the position information of the first accessory rapidly.

In the embodiment of the present invention, in order to realize that the electronic device interacts with at least two accessories independent of the electronic device, it is further needed to obtain the attribute information of the first accessory. The attribute information of the first accessory may include the function, type, shape, material, color or the like of the first accessory. Since the attributes of the first accessory are different, the first accessory has different functions. For example, in the case that an electronic simulating experiment is performed, it is necessary to obtain the type of the first accessory, for example the first accessory is a battery or a capacitance etc. There may be two following ways for the electronic device to obtain the attribute information of the first accessory.

According to a first way, the electronic device receives the attribute information transmitted from the first accessory, and the first accessory includes:

an information transmitting module adapted to transmit the attribute information of the first accessory to the electronic device.

According to a second way, the electronic device captures the attribute information of the first accessory, and the electronic device includes:

an information capturing module adapted to capture the attribute information of the first accessory.

In an embodiment, a bar code may be configured on the first accessory. The bar code is a graphic identifier for expressing a set of information. The bar code is composed of multiple black bars and blanks with unequal width arranged according to a certain encoding rule. The electronic device scans the bar code which carries the attribute information of the first accessory by the information capturing module and obtains the attribute information of the first accessory.

In the embodiment of the present invention, in order to realize that the electronic device interacts with at least two accessories, it is further needed to obtain parameter information of a second accessory. The parameter information of the second accessory includes the position information of the second accessory and the attribute information of the second accessory. The position information of the second accessory is used for representing information of a position where the second accessory is placed on the display device and the attribute information of the second accessory is used for changing the display state of the display device. In an embodiment, the position information of the second accessory may be a coordinate value of the second accessory on the display device. The attribute information of the second accessory may include the function, type, shape, material, color or the like of the second accessory.

The ways to obtain the position information and attribute information of the second accessory are the same as those to obtain the position information and attribute information of the first accessory. Therefore, the specific processes can be referred to the ways to obtain the position information and attribute information of the first accessory and will not be described in detail any more.

A matching process is performed between the obtained parameter information of the first accessory and that of the second accessory. The first accessory and the second accessory are bound if the parameter information of the first accessory and the parameter information of the second accessory satisfy a certain condition.

In an embodiment, a distance between the first accessory and the second accessory may be acquired according to the position information of the first accessory and the position information of the second accessory.

The first accessory and the second accessory are bound if the distance between the first accessory and the second accessory is less than a preset value.

In another embodiment, it is also possible to set a certain binding range in a display area of the display device, and the first accessory and the second accessory are bound if the positions of the first accessory and the second accessory are in the binding range.

In other embodiments, it is also possible that the first accessory and the second accessory are bound if the attribute information of the first accessory is the same as the attribute information of the second accessory.

For example, the first accessory and the second accessory are bound if the type of the first accessory and the type of the second accessory obtained by the electronic device are both batteries.

It should be noted that, in the embodiment of the present invention, the ways of binding are not limited to those above.

It is also possible that the first accessory and the second accessory are bound if the color, material, shape or the like of the first accessory is the same as that of the second accessory.

While the first accessory is bound with the second accessory, it is also needed to generate binding information. The binding information includes combination information generated after the first accessory and the second accessory are bound. The combination information may be a superposition combination of quantities of the two accessories or a combination of colors and also may be a combination of shapes of the two accessories. In an embodiment, the combination information may be the superposition of the quantity of the first accessory and the quantity of the second accessory. For example, in the case that an electronic simulating experiment is performed, after a first battery and a second battery are bound, the combination information is a superposition value of the electrical quantities of the two batteries after being bound.

An application program is preset on the electronic device. The application program may generate a state changing instruction according to the binding information after the first accessory and the second accessory are bound and the binding information is generated. The electronic device switches a first display state of the display device according to the state changing instruction. The first display state is a display state that during a simulating experiment, the electronic device dose not contact with accessories or the electronic device has interacted with the first accessory.

In the embodiment of the present invention, a second display state is the display state of the display device in the case that the electronic device interacts with the first accessory and the second accessory, and the first display state is the display state in the case that the electronic device does not interact with the accessories or the electronic device has interacted only with the first accessory. Therefore, the second display state is different from the first display state.

In an embodiment of the present invention, in S105, the switching the display device from a first display state to a second display state according to the state changing instruction includes:

generating display information according to the state changing instruction, in which the display information includes a graphic of an image to be displayed; and displaying the graphic of the image to be displayed on the display device according to the display information.

In the method for interacting of the embodiment of the present invention, two or more accessories are bound by judging the parameter information of two or more accessories, the binding information as well as the state changing instruction are generated, and the display state of the display device is switched according to the generated state changing instruction. Thereby the interaction between the electronic device and the accessories is realized. Moreover, the dynamic interaction between a user and the electronic device is realized and the user experience is improved.

Figure 2:
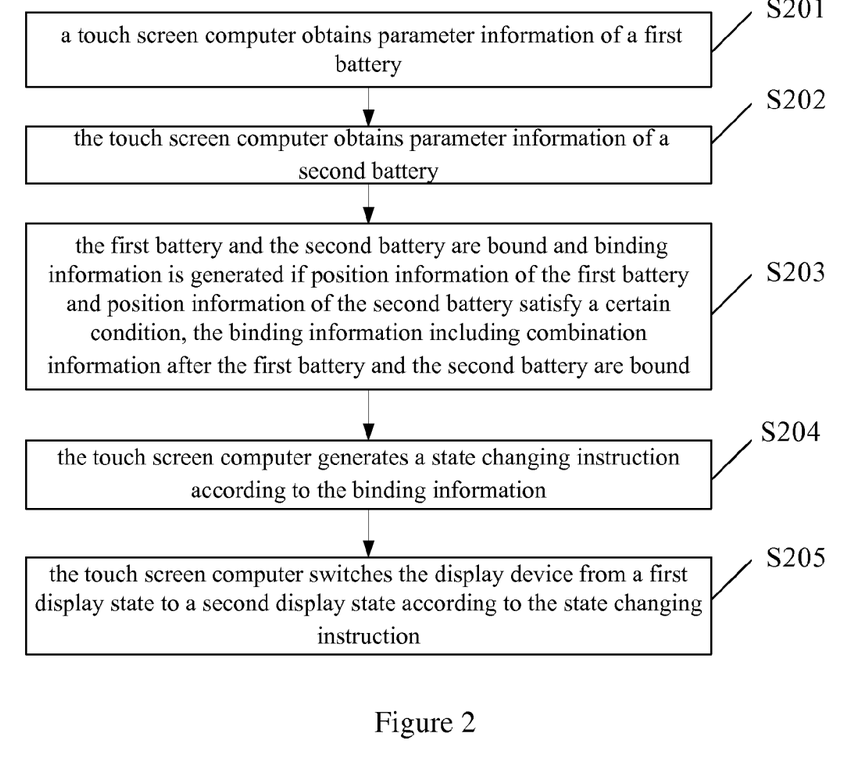
FIG. 2 is a flowchart of another method provided by the present invention.

The embodiment of the present invention also provides a method for interacting. The method is described by taking an electronic simulating experiment performed by a touch screen computer and a first battery and a second battery placed on the touch screen computer as an example. As shown in FIG. 2, the method includes the following steps.

S201, the touch screen computer obtains parameter information of the first battery.

Figure 3:
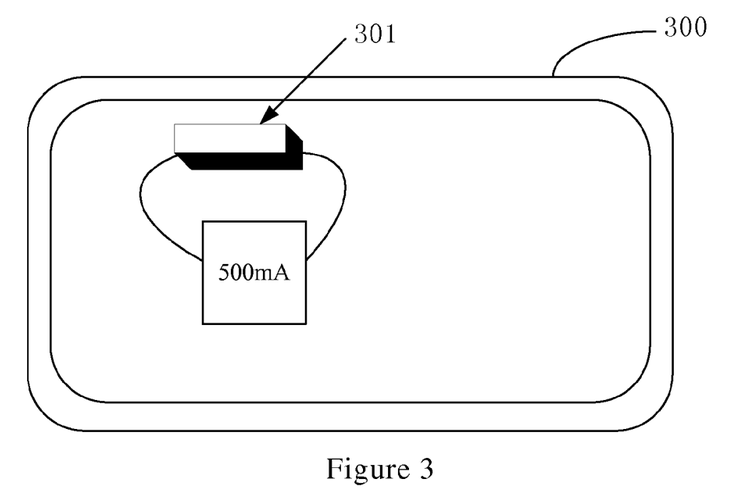
FIG. 3 is a diagram of a display state of a touch screen computer provided by the present invention.

When the touch screen computer performs an electronic simulating experiment, the first battery is placed on the touch screen computer, and thus the touch screen computer may obtain position information of the first battery and attribute information of the first battery. The attribute information of the first battery mainly indicates that the electrical quantity of the battery is 500 mA. According to the electrical quantity of the first battery and the position information of the first battery, the touch screen computer 300 displays the electric quantity of the first battery 301 on the touch screen computer 300, as shown in FIG. 3.

S202, the touch screen computer obtains parameter information of the second battery.

The second battery is placed on the touch screen computer, and thus the touch screen computer may obtain that the electrical quantity of the second battery is 500 mA and also obtain position information of the second battery.

S203, the first battery and the second battery are bound and binding information is generated if the position information of the first battery and the position information of the second battery satisfy a certain condition. The binding information includes combination information after the first battery and the second battery are bound.

The touch screen computer may acquire a distance between the first battery and the second battery according to the position information of the first battery and the position information of the second battery. Moreover, the touch screen computer may compare the distance between the first battery and the second battery with a preset value preset in the touch screen computer, and bind the first battery and the second battery if the distance between the first battery and the second battery is less than the preset value. Then the touch screen computer may generate binding information according to the electrical quantity of the first battery and the electrical quantity of the second battery. The binding information is superposition value of the electrical quantity of the first battery and the electrical quantity of the second battery, that is, the electrical quantity after the first battery and the second battery are bound is 1 A.

S204, the touch screen computer generates a state changing instruction according to the binding information.

The touch screen computer generates the state changing instruction according to the binding information after the touch screen computer binds the first battery and the second battery and generates the binding information. The state changing instruction is used for switching a display state of the touch screen computer.

S205, the touch screen computer switches the display device from a first display state to a second display state according to the state changing instruction.

Figure 4:
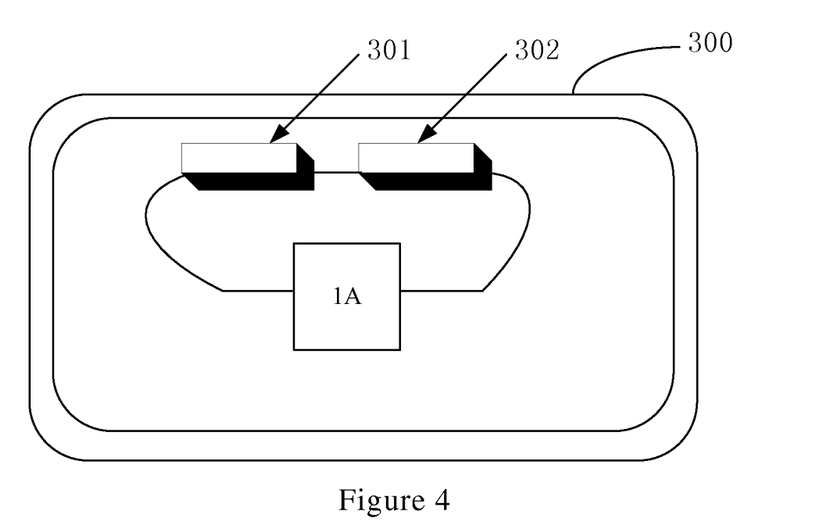
FIG. 4 is a diagram of another display state of the touch screen computer provided by the present invention.

As shown in FIG. 4, the touch screen computer 300 switches from the first display state obtained after the first battery 301 interacts with the touch screen computer to the second display state obtained after the first battery 301 and the second battery 302 are bound. That is to say, the touch screen computer 300 displays that the electrical quantity after the first battery and the second battery are bound is 1 A.

In the method for interacting of the embodiment of the present invention, two batteries are bound according to the parameter information of the two batteries on the touch screen computer, the binding information as well as the state changing instruction are generated, and the display state of the touch screen computer is switched according to the generated state changing instruction. Thereby the interaction between the touch screen computer and the batteries is realized. Moreover, the dynamic interaction between a user and the touch screen computer is realized and the user experience is improved.

An embodiment of the present invention provides an device for interacting, which is applied in an electronic device and at least two external accessories independent of the electronic device, in which the electronic device includes a display device, the electronic device further includes:

an acquiring unit configured to obtain first information of each of the external accessories; and a processing unit adapted to judge whether the first information of each of the external accessories satisfies a preset first condition and to process each of the external accessories according to the preset first condition if the first information of each of the accessories satisfies the preset first condition.

In the device for interacting according to the embodiment of the present invention, at least two external accessories are processed by judging the first information of at least two external accessories. Thereby the interaction between the electronic device and the external accessories is realized. Moreover, the dynamic interaction between a user and the electronic device is realized and the user experience is improved.

Figure 5:
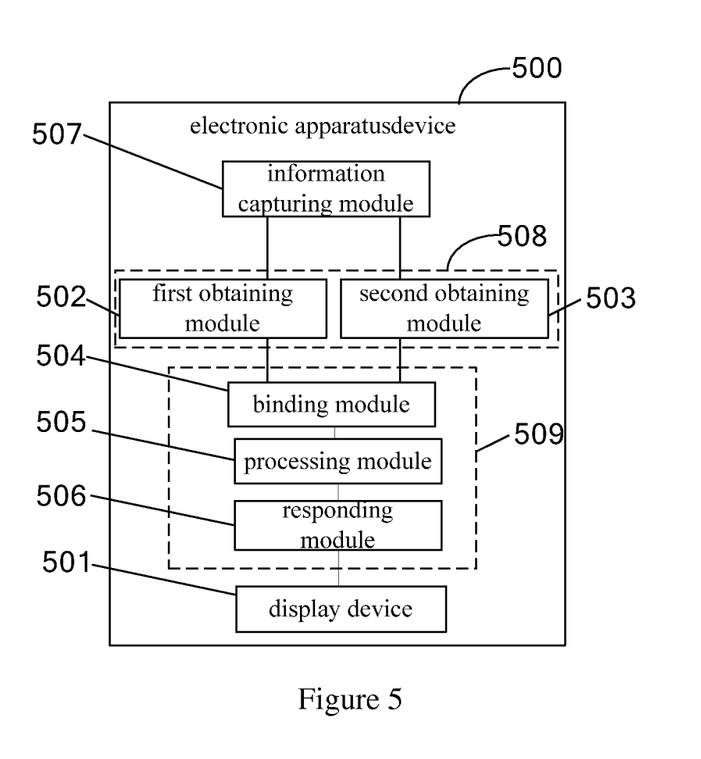
FIG. 5 is a structural schematic diagram of an electronic device provided by the present invention.

As shown in FIG. 5, another embodiment according to the present invention provides an electronic device 500 including a display device 501, an acquiring unit 508 and a processing unit 509. In the embodiment, the first information is parameter information of an external accessory, the acquiring unit 508 includes a first obtaining module 502 and a second obtaining module 503, and the processing unit 509 includes a binding module 504, a processing module 505 and a responding module 506.

The first obtaining unit 502 is adapted to obtain parameter information of a first accessory. The parameter information of the first accessory includes position information of the first accessory and attribute information of the first accessory. The position information of the first accessory is used for representing information of a position where the first accessory is placed on the display device and the attribute information of the first accessory is used for changing the display state of the display device.

The second obtaining module 503 is adapted to obtain parameter information of a second accessory. The parameter information of the second accessory includes position information of the second accessory and attribute information of the second accessory. The position information of the second accessory is used for representing information of a position where the second accessory is placed on the display device and the attribute information of the second accessory is used for changing the display state of the display device.

The binding module 504 is adapted to bind the first accessory and the second accessory and to generate binding information if the parameter information of the first accessory and the parameter information of the second accessory satisfy a certain condition. The binding information includes combination information after the first accessory and the second accessory are bound.

The processing module 505 is adapted to generate a state changing instruction according to the binding information.

The responding module 506 is adapted to switch the display device from a first display state to a second display state according to the state changing instruction. The first display state is different from the second display state.

In an embodiment according to the present invention, the first obtaining module 502 is adapted to receive the position information of the first accessory and the attribute information of the first accessory which are transmitted from the first accessory. The first accessory includes:

a first information transmitting module which is adapted to transmit the position information of the first accessory and the attribute information of the first accessory to the electronic device.

In another embodiment according to the present invention, the electronic device 500 further includes an information capturing module 507 adapted to capture the position information and attribute information of the first accessory and adapted to capture the position information and attribute information of the second accessory.

In addition, the second obtaining module 503 is adapted to:

receive the position information of the second accessory and the attribute information of the second accessory which are transmitted from the second accessory. The second accessory includes:

a second information transmitting module adapted to transmit the position information of the second accessory and the attribute information of the second accessory to the electronic device.

In an embodiment according to the present invention, the binding module 504 is adapted to acquire a distance between the first accessory and the second accessory according to the position information of the first accessory and the position information of the second accessory; and to bind the first accessory and the second accessory if the distance between the first accessory and the second accessory is less than a preset value.

The processing module 505 is further adapted to generate display information according to the state changing instruction, the display information including a graphic of an image to be displayed; and to display the image on the display device according to the display information.

An embodiment according to the present invention also provides a system for interacting, which includes an electronic device and at least two external accessories independent of the electronic device such as a first accessory and a second accessory, in which the electronic device includes a display device for displaying an image;

the electronic device is further adapted to obtain first information of each of the external accessories, to determine whether the first information of each of the external accessories satisfies a preset first condition, and to process the first information of each of the external accessories according to the preset first condition if the first information of each of the external accessories satisfies the preset first condition;

the first accessory is placed on the display device and is adapted to transmit the first information of the first accessory to the electronic device; and the second accessory is placed on the display device and is adapted to transmit the first information of the second accessory to the electronic device.

Figure 6:
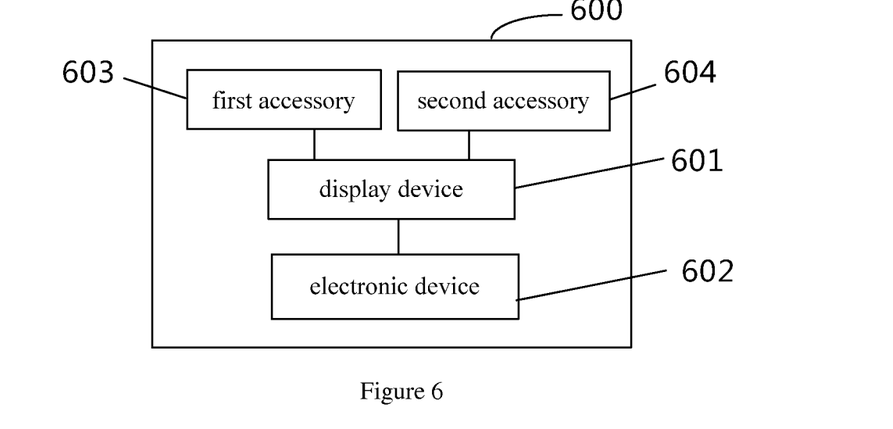
FIG. 6 is a structural schematic diagram of a system for interacting provided by the present invention.

As shown in FIG. 6, a system 600 for interacting according to the embodiment of the present invention includes an electronic device 602, a first accessory 603 and a second accessory 604. The electronic device 602 includes a display device 601 for displaying an image. In the embodiment according to the present invention, the first information of the accessories is the parameter information of the accessories including the position information and attribute information of the accessories.

The electronic device 602 is adapted to obtain the parameter information of the first accessory and the second accessory, to bind the first accessory and the second accessory according to the parameter information of the accessories and generate the binding information, to generate the state changing instruction according to the binding information and to switch the display device from the first display state to the second display state according to the state changing instruction.

The first accessory 603 is placed on the display means and is adapted to transmit the position information and attribute information of the first accessory to the electronic device.

The second accessory 604 is placed on the display device and is adapted to transmit the position information and attribute information of the second accessory to the electronic device.

In the electronic device and the system for interacting according to the embodiment of the present invention, two or more accessories are bound by judging the parameter information of two or more accessories, the binding information as well as the state changing instruction are generated, and the display state of the display device is switched according to the generated state changing instruction. Thereby the interaction between the electronic device and the accessories is realized. Moreover, the dynamic interaction between a user and the electronic device is realized and the user experience is improved.

Other embodiment according to the present invention further provides a method for displaying information, which is applied in an electronic device and at least two external accessories independent of the electronic device. The electronic device includes a display device. Each of the external accessory devices includes a sub-display module. Each of the accessory devices is connected with the electronic device by a wired way, a wireless way or the like. Therefore, the electronic device may receive or transmit sub-display information of the sub-display module in each of the accessory devices.

Figure 7:
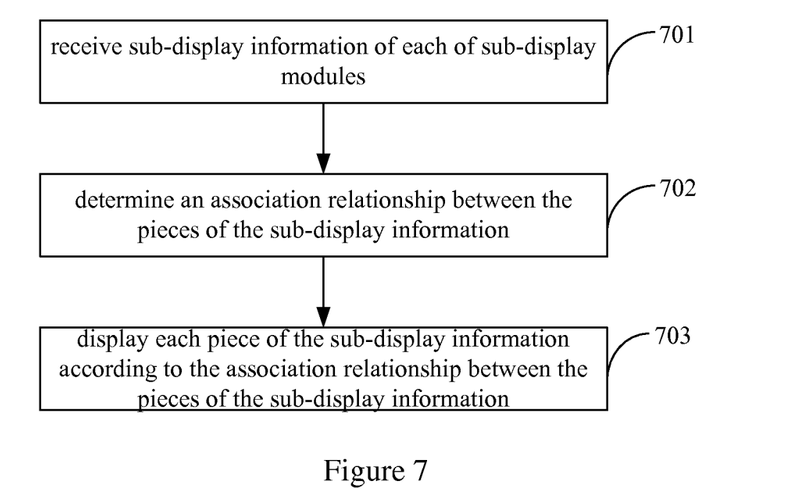
FIG. 7 is a flowchart of a method provided by an embodiment of the present invention.

In an embodiment according to the present invention, the first information is the sub-display information of the sub-display module, and the preset first condition is an association relationship between the pieces of the sub-display information. As shown in FIG. 7, the method includes steps of:

701, receiving the sub-display information of each of the sub-display modules;

702, determining the association relationship between the pieces of the sub-display information; and

703, displaying each piece of the sub-display information according to the association relationship between the pieces of the sub-display information.

In one embodiment, the steps 702 and 703 include:

judging whether there is the preset association relationship between the pieces of the sub-display information; and displaying each piece of the sub-display information according to the association relationship between the pieces of the sub-display information if there is the preset association relationship between the pieces of the sub-display information.

In an embodiment according to the present invention, the sub-display information may be an information unit such as a single Chinese character, a phonetic alphabet or a stroke of a Chinese character. A user may place an accessory device including a sub-display module on a display device of an electronic device (such as a Personal Digital Assistant) after inputting a single piece of sub-display information into the sub-display module. In this way, the accessory device may transmit the single piece of sub-display information input by the user to the electronic device. The user also may only input the sub-display information into the sub-display module, and the sub-display module transmits the sub-display information input by the user to the electronic device.

The association relationship between the pieces of the sub-display information is an arrangement order in which the pieces of the sub-display information compose a pre-stored display information unit.

Firstly, the pieces of the sub-display information are arranged in different arrangement orders respectively to compose multiple display information arrangement units.

For example, in the case that the sub-display information input by the user is "d", "g" and "o", six display information arrangement units including dgo, dog, god, gdo, odg and ogd may be obtained according to different arrangement orders.

Next, a display information unit which is the same as the display information arrangement unit is searched for. The display information unit includes the association relationship between the pieces of the sub-display information.

In another embodiment according to the present invention, a display information unit may be pre-stored in a database and the display information unit may be an idiom, a word, a Chinese character or the like. The display information unit which is the same as the display information arrangement units is searched for in the database. For example, two display information units, i.e. dog and god of the six display information arrangement units composed in the previous step may be searched out.

Three kinds of search results may occur in this step, that is, no display information unit is searched out, only one display information unit is searched out, or two or more display information units are searched out.

Finally, the association relationship between the pieces of the sub-display information is established according to the result of the search.

The association relationship may be determined as follows. If no display information unit which is the same as any of the display information arrangement units is searched out, it is determined that there is no association relationship between the pieces of the sub-display information. For example, in the case that the user inputs four pieces of sub-display information "—", "—", "—" and "—", an unique display information arrangement unit "————" is obtained, and no display information unit which is the same as the unique display information arrangement unit is searched out in the database, therefore it is determined that there is no association relationship between the pieces of the sub-display information "—", "—", "—" and "—" input by the user.

If one display information unit which is the same as the display information arrangement unit is searched out, it is determined that the association relationship between the pieces of the sub-display information is the association relationship between the pieces of the sub-display information included in the display information unit which is searched out. For instance, in the case that the user inputs four pieces of sub-display information "—", "马", "当" and "先", 24 display information arrangement units are obtained, that is, units composed of the four pieces of sub-display information "—", "马", "当" and "先" in different arrangement orders, such as "—先当马", "—当先马", "—马先当", "—马先", "马—先当", "马—当先", "马先—当", 马先当—" and "马先—当" etc. Only one display information unit "—马当先" which is the same as one of the display information arrangement units is searched out in the database. Therefore, the association relationship between the pieces of the sub-display information input by the user, i.e. "—", "先", "当" and "马", is determined to be the association relationship according to the display information unit "—马当先", that is, "—" is connected to "马", "马" is connected to "当" and "当" is connected to "先".

If multiple display information units which are the same as the display information arrangement units are searched out, it is determined that there are multiple association relationships between the pieces of the sub-display information. The multiple association relationships are association relationships between the pieces of the sub-display information included in the multiple display information units which are searched out. For instance, in the case that the pieces of the sub-display information input by the user are "d", "g" and "o", 6 display information arrangement units may be obtained, and two display information units which are the same as the display information arrangement units, i.e. dog and god, may be searched out in the database. Therefore, it is determined that there are two association relationships among the pieces of the sub-display information input by the user, i.e. "d", "g" and "o". A first association relationship is the association relationship of the display information unit dog, that is, "d" is connected to "o" and "o" is connected to "g". A second association relationship is the association relationship of the display information unit god, that is, "g" is connected to "o" and "o" is connected to "d".

In an embodiment according to the present invention, the display process of Step 703 may be performed in the following two cases.

In a first case that it is determined in step 702 that there is one or more association relationships between the pieces of the sub-display information, a position relationship between the sub-display modules corresponding to the pieces of the sub-display information is determined according to the one or more association relationships.

To determine the position relationship between sub-display modules corresponding to the pieces of the sub-display information according to the one or more association relationships includes: display sequence numbers in the display information unit of the sub-display modules corresponding to the pieces of the sub-display information are determined according to the association relationship between the pieces of the sub-display information. The display sequence number is used for identifying the position of the sub-display module. Moreover, the display sequence number includes a 2-bit number, with the first bit of the 2-bit number identifying a row where the sub-display module corresponding to the display sequence number is located and the second bit of the 2-bit number identifying a column where the sub-display module corresponding to the display sequence number is located.

For example, in the case that the user inputs the four pieces of sub-display information "—", "先", "当", "当" and "马", the association relationship between the four pieces of sub-display information "—", "先", "当" and "马" may be obtained by Step 701 and Step 702. That is to say, "—" is connected to "马", "马" is connected to "当" and "当" is connected to "先". The display sequence numbers corresponding to the sub-display modules may be that "—" corresponds to 11, "马" corresponds to 12, "当" corresponds to 13 and "先" corresponds to 14. Thereby the four sub-display modules may be displayed in one row and four columns. The display sequence numbers corresponding to the sub-display modules also may be that "—" corresponds to 11, "马" corresponds to 12, "当" corresponds to 21 and "先" corresponds to 22. Thereby, the four sub-display modules may be displayed in two rows and two columns. Furthermore, the display sequence numbers corresponding to the sub-display modules may also be that "—" corresponds to 11, "马" corresponds to 21, "当" corresponds to 31 and "先" corresponds to 41. Thereby, the four sub-display modules may be displayed in four rows and one column. Of course, the display sequence numbers of the above four sub-display modules also may be other 2-bit numbers which can represent the position relationship between each of the sub-display modules, with the first bit thereof identifying the row where the sub-display module corresponding to the display sequence number is located and the second bit thereof identifying the column where the sub-display module corresponding to the display sequence number is located.

It should be noted that, if it is determined that there are two or more association relationships between the pieces of the sub-display information, the display sequence number of the sub-display module may be determined based on each of the association relationships respectively according to the above method. For example, in the case that the pieces of the sub-display information input by the user are "d", "g" and "o", the first association relationship according to the display information unit "dog" and the second association relationship according to the display information unit "god" may be obtained by Step 701 and Step 702. The display sequence numbers of the sub-display modules in the first association relationship and the display sequence numbers of the sub-display modules in the second association relationship may be determined respectively in accordance with the above method. Of course, the association relationships between each of the sub-display modules may be determined according to a specific application, and the association relationship between the sub-display modules in the above process is only one of applications.

Next, each of the sub-display modules is moved according to the position relationship, so that each of the sub-display modules displays the sub-display information in accordance with the position relationship.

In an embodiment according to the present invention, the display screen of the display device may be divided into multiple sub-display areas corresponding to the display sequence numbers of the sub-display modules. In this way, the pieces of the sub-display information may be displayed according to the association relationship between the pieces of the sub-display information by searching for the sub-display area corresponding to the display sequence number of each of the sub-display modules and moving each of the sub-display modules to the sub-display area corresponding to the sub-display module. For example, in the case that the corresponding relationship between the sub-display modules and the display sequence numbers is that "—" corresponds to 11, "马" corresponds to 12, "当" corresponds to 13 and "先" corresponds to 14, the sub-display areas corresponding to the display sequence numbers 11121314 are searched for on the display screen.

Next, each of the sub-display modules is moved to the sub-display area corresponding to the display sequence number of each of the sub-display modules.

In an embodiment according to the present invention, to move each of the sub-display modules to the sub-display area corresponding to the display sequence number of each of the sub-display modules includes: a first moving device is provided on the electronic device and a second moving device is provided on each of the accessory devices, and there is a moving force between the first moving device and each of the second moving devices to make each of the accessory devices move. Thereby, the first moving device controls the value of the moving force between the first moving device and each of the second moving devices according to the display sequence number corresponding to each of the sub-display modules, and each of the accessory devices is moved to a corresponding sub-display area on the display screen of the display device of the electronic device according to the value of the moving force.

For example, in order to move each sub-display module, devices having magnetic induction may be provided in each of accessory devices and the electronic device, and the electronic device controls magnetic value of each accessory device according to the display sequence number corresponding to each of the sub-display modules of each of the accessory devices, and each of the accessory devices may be moved to a corresponding sub-display area on the display screen of the display device of the electronic device according to the magnetic value.

In a second case that it is determined that there is no association relationship between the pieces of the sub-display information in step 702, no message or an error message is displayed.

For example, in the case that the user input the four pieces of sub-display information "—", "—", "—" and "—", it is determined by Step 702 that there is no association relationship between the pieces of the sub-display information "—", "—", "—" and "—" input by the user. Thus the display device of the electronic device does not display any information on the display screen. Alternatively, the display device of the electronic device displays an error message, such as "input error", on the display screen to prompt that the sub-display information input by the user can not compose corresponding display information unit (such as an idiom or an English word etc).

In the method for displaying information according to the embodiment of the present invention, when a user inputs sub-display information into the sub-display module, the association relationship between the pieces of sub-display information is determined by searching in the database, and each piece of the sub-display information is displayed according to the association relationship. Thereby, sub-display information in at least two accessory devices is displayed in a preset order on the electronic device associated with each of the accessory devices.

Figure 8:
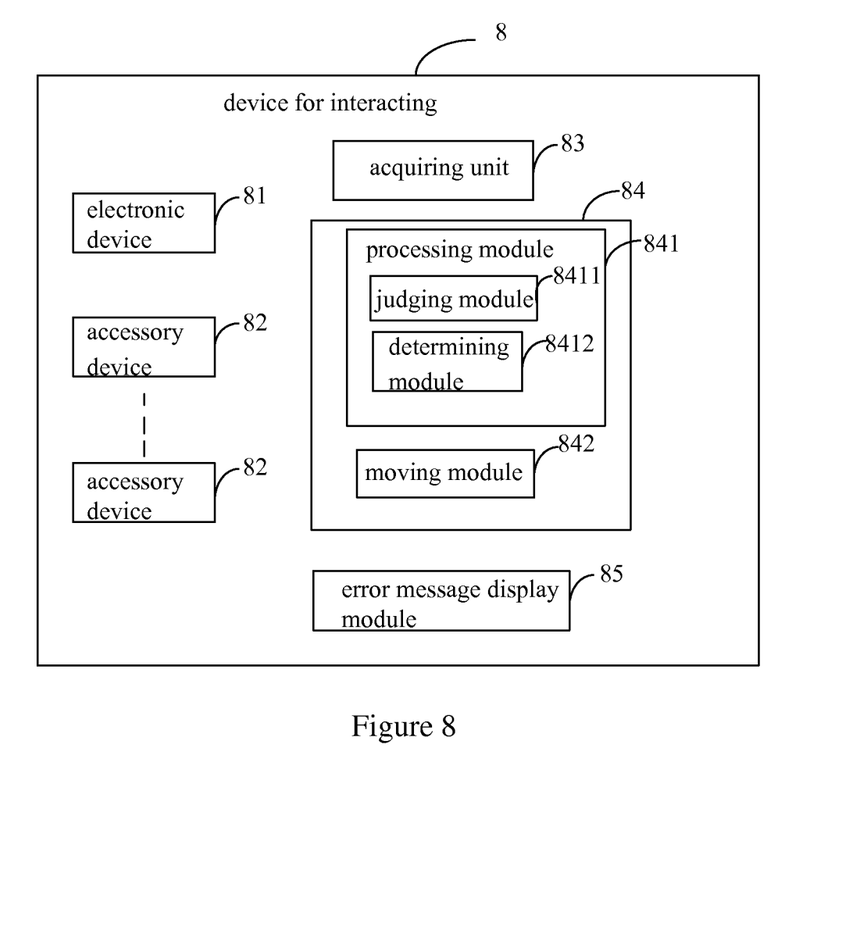
FIG. 8 is a structural diagram of an device provided by an embodiment of the present invention.

The embodiment according to the present invention also provides a device for interacting. As shown in FIG. 8, the device for interacting includes:

an electronic device 81 including a display device;

multiple external accessories devices 82, which is independent of the electronic device and which includes a sub-display module adapted to receive sub-display information input by a user and to transmit the sub-display information to the electronic device;

an acquiring unit 83 adapted to receive the sub-display information transmitted from each sub-display module; and a processing unit 84 adapted to determine association the relationship between the pieces of the sub-display information and control the display device to display each of the pieces of the sub-display information according to the association relationship between the pieces of the sub-display information.

In an embodiment according to the present invention, the processing unit 84 includes:

a processing module 841 adapted to determine a position relationship between the sub-display modules corresponding to the pieces of the sub-display information according to the association relationship if there is an association relationship between the pieces of the sub-display information.

in an embodiment according to the present invention, the case that there is association relationship between the pieces of the sub-display information includes the case that there is a preset association relationship between the pieces of the sub-display information, a moving module 842 adapted to move each of the sub-display modules according to the position relationship.

In an embodiment according to the present invention, the processing module 841 includes:

a judging module 8411 adapted to judge whether there is an association relationship between the sub-display modules; and a determining module 8412 adapted to determine a position relationship between the sub-display modules corresponding to the pieces of the sub-display information according to the association relationship if there is association relationship between the pieces of the sub-display information.

In other embodiment according to the present invention, the device 8 further includes:

an error message display module 85 adapted to display an error message if the judging module determines that there is no association relationship between the pieces of the sub-display information.

In an embodiment according to the present invention, the case that there is no association relationship between the pieces of the sub-display information includes the case that the pieces of the sub-display information do not match the preset association relationship.

The device for interacting in the embodiment according to the present invention is capable of performing steps in the above method embodiments and achieving various functions of the method embodiments. In the application of the device, the method for displaying information is implemented according to the description of the method embodiments.

It should be understood by those skilled in the art that all or a part of the steps for implementing the above method embodiments may be performed by related hardware instructed by a program. The program may be stored in a computer readable storage medium and when being executed may perform steps included in the above method embodiments. The storage medium includes various mediums which may store a program code, such as ROM, RAM, a diskette or a compact disk.

What are described above are only specific embodiments of the present invention. However the scope of protection of the present invention is not limited thereto. Any changes or equivalent substitutions made easily by any of those skilled in the art within the technical scope disclosed in the present invention fall within the scope of protection of the present invention. Therefore, the scope of protection of the present invention should consistent with the scope of protection of the claims.

The invention claimed is:

1. A method for interacting, which is applied in an electronic device and at least two external accessories independent of the electronic device, wherein the electronic device comprises a display device, wherein, the method comprises:
   obtaining first information of each of the external accessories;
   judging whether the first information of each of the external accessories satisfies a preset first condition; and
   processing each of the external accessories according to the preset first condition if the first information of each of the external accessories satisfies the preset first condition,
   wherein the first information is parameter information of the external accessory, and the obtaining first information of each of the external accessories comprises:
   obtaining parameter information of a first accessory, which comprises position information of the first accessory and attribute information of the first accessory, wherein the position information of the first accessory is used for representing information of a position where the first accessory is placed on the display device and the attribute information of the first accessory is used for changing a display state of the display device; and
   obtaining parameter information of a second accessory, which comprises position information of the second accessory and attribute information of the second accessory, wherein the position information of the second accessory is used for representing information of a position where the second accessory is placed on the display device and the attribute information of the second accessory is used for changing the display state of the display device;
   wherein the judging whether the first information of each of the external accessories satisfies a preset first condition and the processing each of the external accessories according to the preset first condition if the first information of each of the external accessories satisfies the preset first condition comprises:
   binding the first accessory and the second accessory and generating binding information if the parameter information of the first accessory and the parameter information of the second accessory satisfy the preset first condition, wherein the binding information comprises combination information after the first accessory and the second accessory are bound;
   generating a state changing instruction according to the binding information; and
   switching the display state of the display device from a first display state to a second display state according to the state changing instruction, wherein the first display state is different from the second display state.

2. The method according to claim 1, wherein the obtaining the parameter information of the first accessory comprises:
   receiving, by the electronic device, the position information of the first accessory and the attribute information of the first accessory which are transmitted from the first accessory, wherein the first accessory comprises:
   a first information transmitting module is configured to transmit the position information of the first accessory and the attribute information of the first accessory to the electronic device;
   or
   capturing, by the electronic device, the parameter information of the first accessory, wherein the electronic device comprises:
   an information capturing module is configured to capture the position information of the first accessory and the attribute information of the first accessory.

3. The method according to claim 1, wherein the obtaining parameter information of the second accessory comprises:
   receiving, by the electronic device, the position information of the second accessory and the attribute information of the second accessory which are transmitted from the second accessory, wherein the second accessory comprises:
   a second information transmitting module is configured to transmit the position information of the second accessory and the attribute information of the second accessory to the electronic device;
   or
   capturing, by the electronic device, the parameter information of the second accessory, wherein the electronic device comprises:
   an information capturing module is configured to capture the position information of the second accessory and the attribute information of the second accessory.

4. The method according to claim 1, wherein the binding the first accessory and the second accessory if the parameter information of the first accessory and the parameter information of the second accessory satisfy the preset first condition comprises:

acquiring a distance between the first accessory and the second accessory according to the position information of the first accessory and the position information of the second accessory; and binding the first accessory and the second accessory if the distance between the first accessory and the second accessory is less than a preset value;

or binding the first accessory and the second accessory if the attribute information of the first accessory is the same as the attribute information of the second accessory.

5. A method for interacting, which is applied in an electronic device and at least two external accessories independent of the electronic device, wherein the electronic device comprises a display device, wherein, the method comprises:

obtaining first information of each of the external accessories;

judging whether the first information of each of the external accessories satisfies a preset first condition; and processing each of the external accessories according to the preset first condition if the first information of each of the external accessories satisfies the preset first condition, wherein the external accessory comprises a sub-display module and the first information is sub-display information of the sub-display module, the preset first condition is a preset association relationship between pieces of the sub-display information, the method further comprises:

receiving the sub-display information of each of the sub-display modules;

judging whether there is the preset association relationship between the pieces of the sub-display information; and displaying each piece of the sub-display information according to the association relationship between the pieces of the sub-display information if the pieces of the sub-display information match a preset association relationship.

6. The method according claim 5, wherein the judging whether the pieces of the sub-display information match a preset association relationship comprises:

arranging the pieces of the sub-display information in different arrangement orders respectively to compose a plurality of display information arrangement units;

searching for a display information unit which is the same as the display information arrangement unit, wherein the display information unit comprises the association relationship between the pieces of the sub-display information; and determining the association relationship between the pieces of the sub-display information according to a result of the search.

7. The method according to claim 6, wherein the determining the association relationship between the pieces of the sub-display information according to the result of the search comprises:

determining that there is no association relationship between the pieces of the sub-display information if no display information unit which is the same as any of the display information arrangement units is searched out;

determining that the association relationship between the pieces of the sub-display information is the association relationship between the pieces of the sub-display information comprised in the display information unit which is searched out if one display information unit which is the same as the display information arrangement unit is searched out; and determining that there are a plurality of association relationships between the pieces of the sub-display information, wherein the plurality of association relationships are association relationships between the pieces of the sub-display information comprised in the plurality of display information units which are searched out if a plurality of display information units which are the same as the display information arrangement units are searched out.

8. The method according to claim 6, wherein the displaying each piece of the sub-display information according to the association relationship between the pieces of the sub-display information comprises:

determining a position relationship between the sub-display modules corresponding to the pieces of the sub-display information according to the one or more association relationships if there is one or more association relationships between the pieces of the sub-display information; and moving each of the sub-display modules according to the position relationship so that each of the sub-display modules displays the sub-display information according to the position relationship.

9. The method according to claim 8, wherein the determining the position relationship between the sub-display modules corresponding to the pieces of the sub-display information according to one or more association relationships comprises:

determining display sequence numbers in the display information unit of the sub-display modules corresponding to the pieces of the sub-display information according to the association relationship between the pieces of the sub-display information, wherein a display sequence number is used for identifying the position of the sub-display module.

10. The method according to claim 8, wherein the moving each of the sub-display modules according to the position relationship comprises:

searching for a sub-display area corresponding to a display sequence number of each of the sub-display modules; and moving each of the sub-display modules to the sub-display area corresponding to the sub-display module.

11. The method according to claim 10, wherein the electronic device further comprises a first moving device, each of the external accessories further comprises a second moving device, and there is a moving force between the first moving device and the second moving device for moving each of the external accessories, the moving each of the sub-display modules to the sub-display area corresponding to the sub-display module comprises:

controlling, by the first moving device, a value of the moving force between the first moving device and the second moving device according to the display sequence number corresponding to each of the sub-display modules, so that each of the external accessories is moved to a corresponding sub-display area on a display screen of the display device of the electronic device according to the value of the moving force.

12. A device for interacting, which is applied in an electronic device and at least two external accessories independent of the electronic device, wherein the electronic device comprises a display device, characterized in that the device further comprises:

an acquiring unit, configured to obtain first information of each of the external accessories; and a processing unit, configured to judge whether the first information of each of the external accessories satisfies a preset first condition and to process each of the external accessories according to the preset first condition if the first information of each of the external accessories satisfies the preset first condition, wherein the first information is parameter information of the external accessory, the acquiring unit comprises a first obtaining module and a second obtaining module, and the processing unit comprises a binding module, a processing module and a responding module, the first obtaining module is configured to obtain parameter information of a first accessory, which comprises position information of the first accessory and attribute information of the first accessory, wherein the position information of the first accessory is used for representing information of a position where the first accessory is placed on the display device and the attribute information of the first accessory is used for changing a display state of the display device;

the second obtaining module is configured to obtain parameter information of a second accessory, which comprises position information of the second accessory and attribute information of the second accessory, wherein the position information of the second accessory is used for representing information of a position where the second accessory is placed on the display device and the attribute information of the second accessory is used for changing the display state of the display device;

the binding module is configured to bind the first accessory and the second accessory and to generate binding information if the parameter information of the first accessory and the parameter information of the second accessory satisfy the preset first condition, wherein the binding information comprises combination information after the first accessory and the second accessory are bound;

the processing module is configured to generate a state changing instruction according to the binding information; and the responding module is configured to switch the display state of the display device from a first display state to a second display state according to the state changing instruction, wherein the first display state is different from the second display state.

13. The device for interacting according to claim 12, wherein the first obtaining module is further configured to receive the position information of the first accessory and the attribute information of the first accessory which are transmitted from the first accessory, wherein the first accessory comprises:

a first information transmitting module, configured to transmit the position information of the first accessory and the attribute information of the first accessory to the electronic device.

14. The device for interacting according to claim 12, wherein the electronic device further comprises an information capturing module, configured to capture the position information of the first accessory and the attribute information of the first accessory and to capture the position information of the second accessory and the attribute information of the second accessory.

15. The device for interacting according to claim 12, wherein the second obtaining module is further configured to receive the position information of the second accessory and the attribute information of the second accessory which are transmitted from the second accessory, wherein the second accessory comprises:

a second information transmitting module, configured to transmit the position information of the second accessory and the attribute information of the second accessory to the electronic device.

16. The device for interacting according to claim 12, wherein the binding module is further configured to acquire a distance between the first accessory and the second accessory according to the position information of the first accessory and the position information of the second accessory;

bind the first accessory and the second accessory if the distance between the first accessory and the second accessory is less than a preset value; or bind the first accessory and the second accessory if the attribute information of the first accessory is the same as the attribute information of the first accessory of the second accessory.

17. A device for interacting, which is applied in an electronic device and at least two external accessories independent of the electronic device, wherein the electronic device comprises a display device, characterized in that the device further comprises:

an acquiring unit, configured to obtain first information of each of the external accessories; and a processing unit, configured to judge whether the first information of each of the external accessories satisfies a preset first condition and to process each of the external accessories according to the preset first condition if the first information of each of the external accessories satisfies the preset first condition, wherein each of the external accessories comprises a sub-display module and the first information is sub-display information of the sub-display module; the preset first condition is an association relationship between pieces of the sub-display information; the sub-display module is configured to receive the sub-display information input by a user and transmit the sub-display information to the electronic device;

the acquiring unit of the electronic device is configured to receive the sub-display information transmitted from each of the sub-display modules; and the processing unit of the electronic device is configured to judge whether there is a preset association relationship between the pieces of the sub-display information, and display each piece of the sub-display information according to the association relationship between the pieces of the sub-display information if there is the preset association relationship between the pieces of the sub-display information.

18. The device for interacting according to claim 17, wherein the processing unit comprises, a processing module, configured to, if there is the preset association relationship between the pieces of the sub-display information, determine a position relationship between the sub-display modules corresponding to the pieces of the sub-display information according to the association relationship; and a moving module, configured to move each of the sub-display modules according to the position relationship.

19. The device for interacting according to claim 18, wherein the processing module comprises, a judging module, configured to judge whether there is an association relationship between the sub-display modules; and a determining module, configured to determine a position relationship between the sub-display modules corresponding to the pieces of the sub-display information according to the association relationship if there is the association relationship between the pieces of the sub-display information.

* * * * *